(No Model.)
A. J. MUNSON.
COUPLING FOR LIGHTNING RODS.
No. 332,673. Patented Dec. 15, 1885.
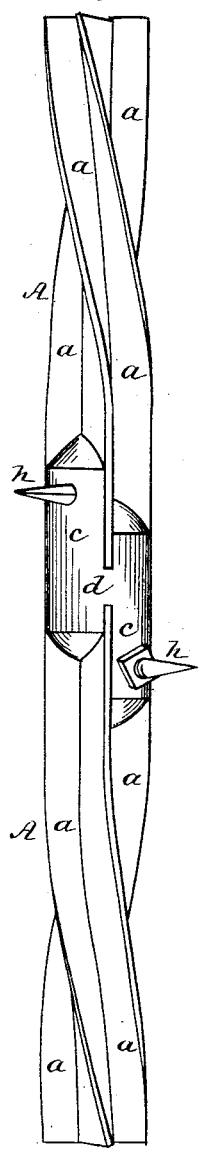
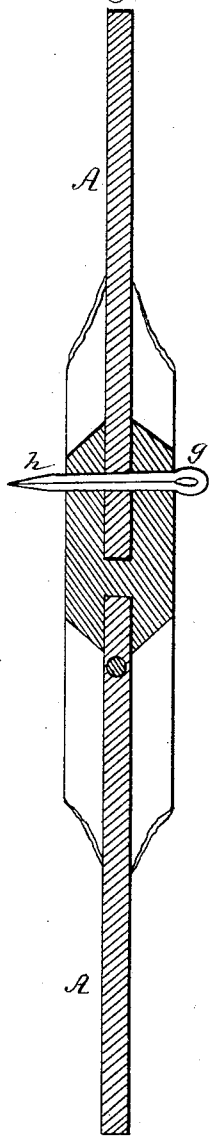
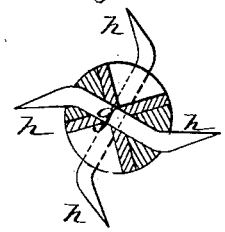
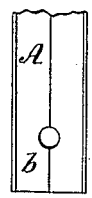
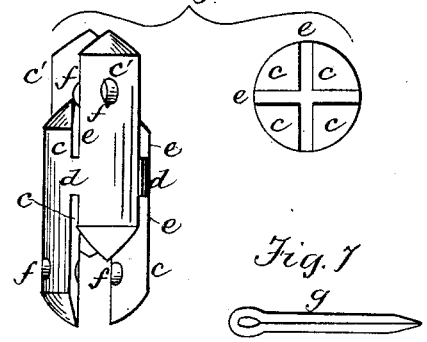
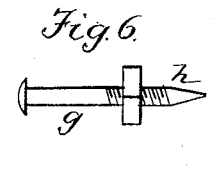
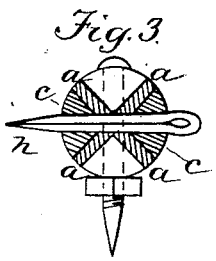
Witnesses:
R. E. Grant
G. E. Tucker
Inventor:
Alvin Johnston Munson
by Johnson and Johnson
Attys.

UNITED STATES PATENT OFFICE.

ALVIN JOHNSTON MUNSON, OF INDIANAPOLIS, INDIANA.

COUPLING FOR LIGHTNING-RODS.

SPECIFICATION forming part of Letters Patent No. 332,673, dated December 15, 1885.

Application filed June 17, 1885. Serial No. 169,982. (No model.)

*To all whom it may concern:*

Be it known that I, ALVIN JOHNSTON MUNSON, a citizen of the United States, residing at Indianapolis, in the county of Marion and State of Indiana, have invented new and useful Improvements in Couplings for Lightning-Rods, of which the following is a specification.

The invention relates to means for coupling the sections of lightning-rods; and the object of the improvement is to not only effect the coupling of the sections by a peculiar coupling device, but to make the bolts which fasten said coupling useful as gathering and dispersing points for the electric current.

The coupling proper, with its bolting parts and the manner of connecting the sections of the rod, is hereinafter set forth.

Referring to the accompanying drawings, Figure 1 represents a spirally-twisted lightning-rod, the sections whereof are secured together by my improved coupling; Fig. 2, a vertical longitudinal section of Fig. 1; Fig. 3, a cross-section through the coupled rod-sections and the rod-coupling; Fig. 4, a perspective and end views of the coupling proper; Figs. 5, 6, and 7, details of the various forms of securing-bolts, adapted also as gathering and dispersing points; Fig. 8, a detail of one section of the rod, to show the bolt-hole therein.

The coupling may be adapted to suit any form of spirally-twisted lightning-rod, but as herein described it is with reference to the "star" lightning-rod of David Munson. In this example four webs radiate and are spirally twisted, as the drawings show, and their sections coupled by my improved coupling. The rod is of sections A A and of four radiating webs, *a a a a*, through which, at their junction ends, are drilled holes *b*, for the through reception of the fastening-bolts of the coupling. The twists of the spiral webbing of the several sections terminate at the section-joining ends in parallel lines, and form a four-pointed star or Greek cross in transverse section.

The coupling, Fig. 4, is a single casting of four quadrants, *c c c c*, of a solid cylinder, united by a transverse connecting-web part, *d*, which abuts the joined sections of the webbed spiral rod, and has a sufficient space, *e*, made by such separating part, to permit of the entry of the webs of the sections within the separating-space between the quadrants. Alternate quadrants *c' c'* are provided with drilled bolt-holes *f f*, and, for convenience of boring and fastening, are brought in the relation shown in said Fig. 4—that is to say, opposite pairs of quadrants of the cylinder-casting being in different vertical relation to opposite different pairs; but this is not at all a necessity, since the bolt-holes might be made through from one quadrant to its opposite with all four quadrants terminating equally. Still, I prefer the construction shown.

Through the described holes of the coupling and rod sections, within the webs of which the coupling is, there are passed locking-bolts *g*, which, as shown in the detail drawings, are of various constructions, as I do not confine myself to any particular style of bolt. I may use a bolt with a locking-nut or I may use a split-spring bolt-pin or I may use a pin-fastening alternately upset after insertion upon opposite sides. In any event, there is a point, *h*, to the locking-bolt, which is designed to gather and disperse the electric discharge. This has been premised, and that is an important matter of this improvement, in that the very bolts which fasten the coupling for the section are also gathering and dispersing points.

The manner of uniting the sections of the webbed spirally-twisted rod is surely well understood from what is above written with reference to the drawings. Each rod-section is braced by the four quadrants, but bolted only to two quadrants, and the bolts of each section are at right angles, to brace the joining.

I claim—

1. The combination, with the sections of a spirally-twisted lightning-rod of four webs, of a coupling-casting of four quadrants of a solid cylinder united by a transverse web, *d*, and provided with bolt-openings and coupling-bolts therefor, substantially as and for the purpose set forth.

2. The combination, with the sections of a spirally-twisted lightning-rod of four webs, of a coupling-casting formed of four quadrants of a solid cylinder united by a transverse-web part, and provided with bolt-openings and coupling-bolts therefor, pointed, as described, whereby the electric discharge is gathered and dispersed, substantially as described.

3. The combination, with the rod-sections, of the coupling having matching quadrant-arms and bolts passing through them in pairs at right angles, as shown and described.

In testimony whereof I have hereunto set my hand in the presence of two subscribing witnesses.

ALVIN JOHNSTON MUNSON.

Witnesses:
DAVID R. MUNSON,
WM. H. BENNETT.